United States Patent [19]

Oono et al.

[11] Patent Number: 5,012,882
[45] Date of Patent: May 7, 1991

[54] DRIVING WHEEL SLIP CONTROL SYSTEM FOR VEHICLES

[75] Inventors: Tetsuya Oono; Eitetsu Akiyama, both of Wako, Japan

[73] Assignee: Honda Giken Kogyo Kabushiki Kaisha, Tokyo, Japan

[21] Appl. No.: 546,607

[22] Filed: Jun. 28, 1990

[30] Foreign Application Priority Data

Jul. 17, 1989 [JP] Japan ............................ 1-83903[U]

[51] Int. Cl.$^5$ ............................................. B60K 31/00
[52] U.S. Cl. .............................. 180/197; 123/198 DB
[58] Field of Search ................. 180/197; 123/198 DB, 123/198 F

[56] References Cited

U.S. PATENT DOCUMENTS 4,860,849  8/1989  Andersson et al. .................. 180/197

FOREIGN PATENT DOCUMENTS

58-8436  1/1983  Japan .
0151160  8/1985  Japan .................................. 180/197

Primary Examiner—Charles A. Marmor
Assistant Examiner—Victor E. Johnson
Attorney, Agent, or Firm—Armstrong, Nikaido, Marmelstein, Kubovcik, & Murray

[57] ABSTRACT

A driving wheel slip control system in which cutoff of fuel supply to a cylinder to be controlled in respect of fuel supply when it has been determined that fuel cut is required, for the first time after a predetermined condition for carrying out driving wheel slip control was satisfied, is inhibited, when the cylinder belongs to the rear bank of cylinders of an internal combustion engine.

4 Claims, 6 Drawing Sheets

| TC LEVEL \ n INJ | 0 | 1 | 2 | 3 | 4 | 5 |
|---|---|---|---|---|---|---|
| LVL 6 | F/C | F/C | F/C | F/C | F/C | F/C |
| LVL 5 | F/C | F/C | F/C | F/C | F/C | L |
| LVL 4 | F/C | F/C | L | F/C | F/C | L |
| LVL 3 | F/C | L | L | F/C | F/C | L |
| LVL 2 | F/C | L | L | F/C | L | L |
| LVL 1 | F/C | L | L | L | L | L |
| LVL 0 | L | L | L | L | L | L |

FIG.6

DRIVING WHEEL SLIP CONTROL SYSTEM FOR VEHICLES

BACKGROUND OF THE INVENTION

This invention relates to a driving wheel slip control system for vehicles, and more particularly to a driving wheel control system for a vehicle in which is installed an internal combustion engine having a plurality of cylinders arranged in two banks, one located in a front portion of the engine room and the other in a rear portion of the same.

As recognized in general, a driving wheel of an automotive vehicle undergoes a slip when the vehicle is started to run or when it is accelerated, if the driving force of the driving wheel surpasses a frictional force developed between the tire of the driving wheel and the road surface.

In order to control or prevent such slips of driving wheels, driving wheel slip control (hereinafter referred to as "traction control") is conventionally carried out. According to the oonventional traction control, when an excessive slip of at least one driving wheel is detected, the output torque (driving force) of the engine is reduced to thereby suppress the excessive slip. The reduction of output torque of the engine can be performed very effectively by cylinder-by-cylinder control, e.g. by gradually increasing the number of cylinders to be subjected to fuel cut. For example, a driving wheel slip control system has been proposed by Japanese Provisional Patent Publication (Kokai) No. 58-8436, in which a slip state of at least one driving wheel is detected, and in response to the detected slip state, the supply of fuel to the engine connected to the driving wheels is cut off, cylinder by cylinder.

However, depending on the type of an internal combustion engine installed in the vehicle, fuel cut carried out in accordance with the traction control can cause increase in the temperatures of the engine per se, an exhaust gas concentration sensor arranged in the exhaust system, a catalyst for purifying exhaust gases, etc.

More specifically, in the case of a V-type engine disposed transversely of the engine room, a plurality of cylinders are arranged in two banks, one located in a front portion of the engine room (i.e. front bank) and the other in a rear portion of same (i.e. rear bank). Since part of the engine room on the rear side of the engine is hard to cool off, the heat of the rear bank of the cylinders cannot be efficiently dissipated, so that the temperature of the rear bank tends to be higher than that of the front bank. The higher temperature of the rear bank of the cylinders also results in inoreased temperature of the exhaust system of the rear bank, increasing the temperatures of the above-mentioned devices.

If in the above-mentioned type of engine in which the rear bank of the cylinders is higher in temperature than the front bank of same, cylinders are subjected to fuel cut in accordance with the traction control indiscriminately, i.e. irrespective of whether the cylinders to be subjected to fuel cut are on the front bank or the rear bank, when the conditions for carrying out fuel cut are satisfied, the temperatures of cylinders on the rear bank can become excessively high since cooling of the rear bank by fuel is not effected.

The thus increased temperature of the engine oan cause undesired thermal damage to the cylinder block of the engine as well as to the exhaust system. Therefore, there is room for improvement in the traction control of carrying out fuel cut of cylinders irrespective of whether cylinders are on the front bank or the rear bank by the driving wheel slip control system for the above-mentioned type of engine.

SUMMARY OF THE INVENTION

It is the object of the invention to provide a driving wheel slip control system for a vehicle in which is installed an internal combustion engine having two banks of cylinders located in front and rear portions of the engine room, respectively, which is capable of carrying out traction control in a manner more suitable for the temperature distribution of this type of engine, to thereby protect the cylinder block of the engine and the exhaust system of same from thermal damage.

To attain the above object, the present invention provides a system for controlling a slip of at least one driving wheel of an automotive vehicle having an engine room in which is installed an internal combustion engine having a plurality of cylinders arranged, respectively, in a front bank located in a front portion of the engine room and a rear bank located in a rear portion of same, the system including driving wheel slip-detecting means for detecting a slip of the at least one driving wheel, and fuel supply cutoff means for cutting off the fuel supply to the engine, cylinder by cylinder, in response to an output from the driving wheel slip-detecting means.

The system according to the invention is characterized by comprising:

cylinder-discriminating means for determining whether or not a cylinder to be controlled in respect of fuel supply when the fuel supply cutoff means has determined that fuel cut is required, for the first time after a predetermined condition for carrying out control of the slip of the at least one driving wheel was satisfied, belongs to the rear bank; and fuel cut-inhibiting means for inhibiting the fuel supply cutoff means from cutting off the fuel supply to the cylinder, when the cylinder-discriminating has determined that the cylinder belongs to the rear bank.

Preferably, the fuel cut-inhibiting means carries out leaning of an air-fuel mixture to be supplied to the cylinder to be controlled in respect of fuel supply.

Also preferably, the cylinders are sequentially controlled in respect of fuel supply in predetermined sequence in a manner such that cylinders on the front bank and cylinders on the rear bank are alternately controlled, and a cylinder to be controlled in respect of fuel supply immediately following the first-mentioned cylinder is subjected to fuel cut by the fuel supply cutoff means.

More preferably, the ratio of the number of cylinders to be subjected to the fuel cut to the number of cylinders to be subjected to leaning of an air-fuel mixture is increased as a slip level of the at least one driving wheel detected by the driving wheel slip-detecting means is higher.

The above and other objects, features, and advantages of the invention will become more apparent from the ensuing detailed desoription taken in conjunction with the accompanying drayings.

DETAILED DESCRIPTION

The driving wheel slip control system according to the invention will now be described in detail with reference to the drawings showing an embodiment thereof.

Figure 1:
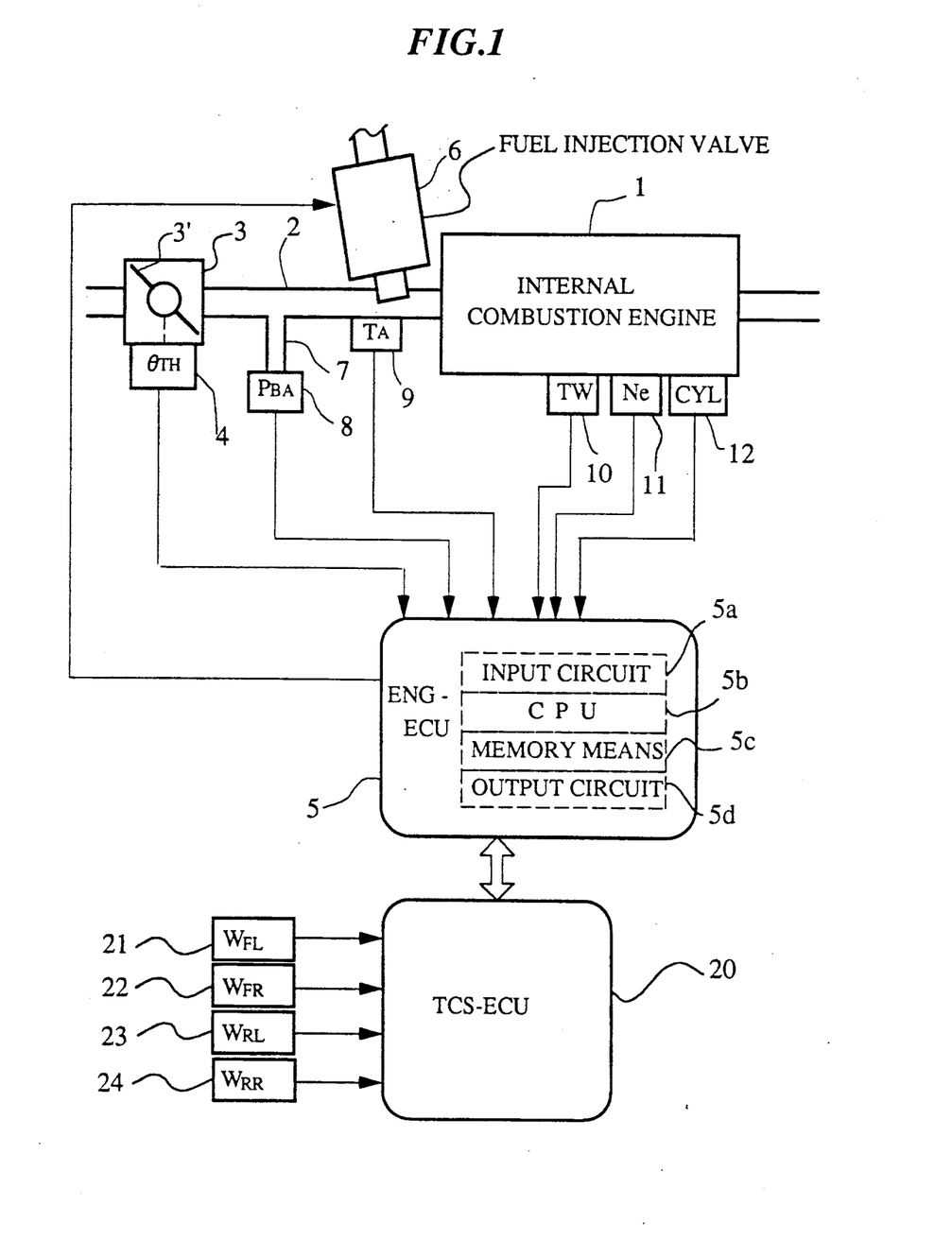
FIG. 1 is a schematic diagram showing the whole arrangement of a driving wheel slip control system according to an embodiment of the invention.

Referring first to FIG. 1, there is shown the whole arrangement of a driving wheel slip control system according to an embodiment of the invention. In the figure, reference numeral 1 designates an internal combustion engine for automotive vehicles, which is of a type having two banks of cylinders disposed transversely of an engine room, not shown, the banks being located in front and rear portions of the engine room, respectively, e.g. a V-type engine. The cylinders are sequentially controlled in respect of fuel supply in predetermined sequence in a manner such that cylinders on the front bank and cylinders on the rear bank are alternately controlled. Connected to the cylinder block of the engine 1 is an intake pipe 2 across which is arranged a throttle body 3 accommodating a throttle valve 3' therein. A throttle valve opening ($\theta_{TH}$) sensor 4 is connected to the throttle valve 3' for generating an electric signal indicative of the sensed throttle valve opening and supplying same to an electronic control unit (hereinafter referred to as "the ENG-ECU") 5.

Fuel injection valves 6, only one of which is shown, are inserted into the intake pipe at locations intermediate between the cylinder block of the engine 1 and the throttle valve 3' and slightly upstream of respective intake valves, not shown. The fuel injection valves 6 are connected to a fuel pump, not shown, and electrically connected to the ENG-ECU 5 to have their valve opening periods controlled by signals therefrom.

An intake pipe absolute pressure ($P_{BA}$) sensor 8 is provided in communication with the interior of the intake pipe 2 via a conduit 7 at a location immediately downstream of the throttle valve 3' for supplying an electric signal indicative of the sensed absolute pressure within the intake pipe 2 to the ENGECU 5. An intake air temperature ($T_A$) sensor 9 is inserted into the intake pipe 2 at a location downstream of the intake pipe absolute pressure sensor 8 for supplying an electric signal indicative of the sensed intake air temperature $T_A$ to the ENG-ECU 5.

An engine coolant temperature ($T_W$) sensor 10, which may be formed of a thermistor or the like, is mounted in the cylinder block of the engine 1, for supplying an electric signal indicative of the sensed engine coolant temperature $T_W$ to the ENG-ECU 5. An engine rotational speed (Ne) sensor 11 and a cylinder-discriminating (CYL) sensor 12 are arranged in facing relation to a camshaft, not shown, or a crankshaft, not shown, of the engine 1. The engine rotational speed sensor 11 generates a pulse as a TDC signal pulse at each of predetermined crank angles whenever the crankshaft rotates through a predetermined angle. In other words, the engine rotational speed sensor 11 generates TDC signal pulses which are identical in number to the number of cylinders whenever the camshaft makes one rotation. The cylinder-discriminating sensor 12 generates a pulse at a predetermined crank angle of a particular cylinder of the engine. Both the pulses generated by the sensors 11 and 12 are supplied to the ENG-ECU 5.

Further, an $O_2$ sensor as an exhaust gas concentration sensor and a three-way catalyst as an exhaust gas purifying device, neither of them being shown, are provided in the exhaust system of the engine 1. An output signal from the $O_2$ sensor indicative of the sensed oxygen concentration in exhaust gases is also supplied to the ENG-ECU 5.

Further electrically connected to the ENG-ECU 5 is an electronic control unit (hereinafter referred to as "TCS-ECU") 20 for sensing a driving wheel slip, to which are connected driving wheel speed sensors 21, 22 for detecting the rotational speeds $W_{FR}$, $W_{FL}$ of respective right and left driving wheels, not shown, and trailing wheel speed sensors 23, 24 for detecting the rotational speeds $W_{RR}$, $W_{RL}$ of respective right and left trailing wheels, not shown. Signals indicative of the detected rotational speeds of the wheels detected by the sensors 21 to 24 are supplied to the TCS-ECU 20.

In this embodiment of the invention, the ENG-ECU comprises fuel supply cutoff means, cylinder-discriminating means, and fuel cut-inhibiting means. The TCS-ECU 20 comprises driving wheel slip-detecting means.

The ENG-ECU 5 comprises an input circuit 5a having the functions of shaping the waveforms of input signals from various sensors and the TCS-ECU 20, shifting the voltage levels of sensor output signals to a predetermined level, converting analog signals from analog-output sensors to digital signals, and so forth, a central processing unit (hereinafter referred to as "the CPU") 5b, memory means 5c storing various operational programs which are executed in the CPU 5b and for storing results of calculations therefrom, etc., and an output circuit 5d which outputs driving signals to the fuel injection valves 6.

The CPU 5b operates in response to the above-mentioned signals from the sensors to determine operating conditions in which the engine 1 is operating, and calculates, based upon the determined operating conditions, the valve opening period or fuel injection period $T_{OUT}$ over which the fuel injection valves 6 are to be opened, by the use of the following equation (1) in synchronism with inputting of TDC signal pulses to the ENG-ECU 5.

$$T_{OUT} = Ti \times K_1 + K_2 \quad (1)$$

where Ti represents a basic fuel amount, more specifically a basic fuel injection period of the fuel injection valves 6, which is determined based upon the engine rotational speed Ne and the intake pipe absolute pressure $P_{BA}$. As a Ti map for determining a value of the basic fuel amount Ti, a normal Ti map to be used under normal operating conditions of the engine in which traction control (driving wheel slip control), described in detail hereinafter, is not carried out, and a traction control Ti map to be used during traction control, are stored in the memory means 5c. The values of the basic fuel amount Ti of the traction control Ti map are so set that a value of the air-fuel ratio (e.g. A/F = 18.0) leaner than a stoichiometric ratio is obtained.

$K_1$ and $K_2$ represent correction coefficients and correction variables, respectively, which are calculated based on various engine operating parameter signals to such values as to optimize operating characteristics of the engine such as fuel consumption and accelerability, depending on operating conditions of the engine.

The CPU 5b supplies through the output circuit 5d driving signals for driving the fuel injection valves 6 based upon the fuel injection period $T_{OUT}$ calcualted as above.

Figure 2:
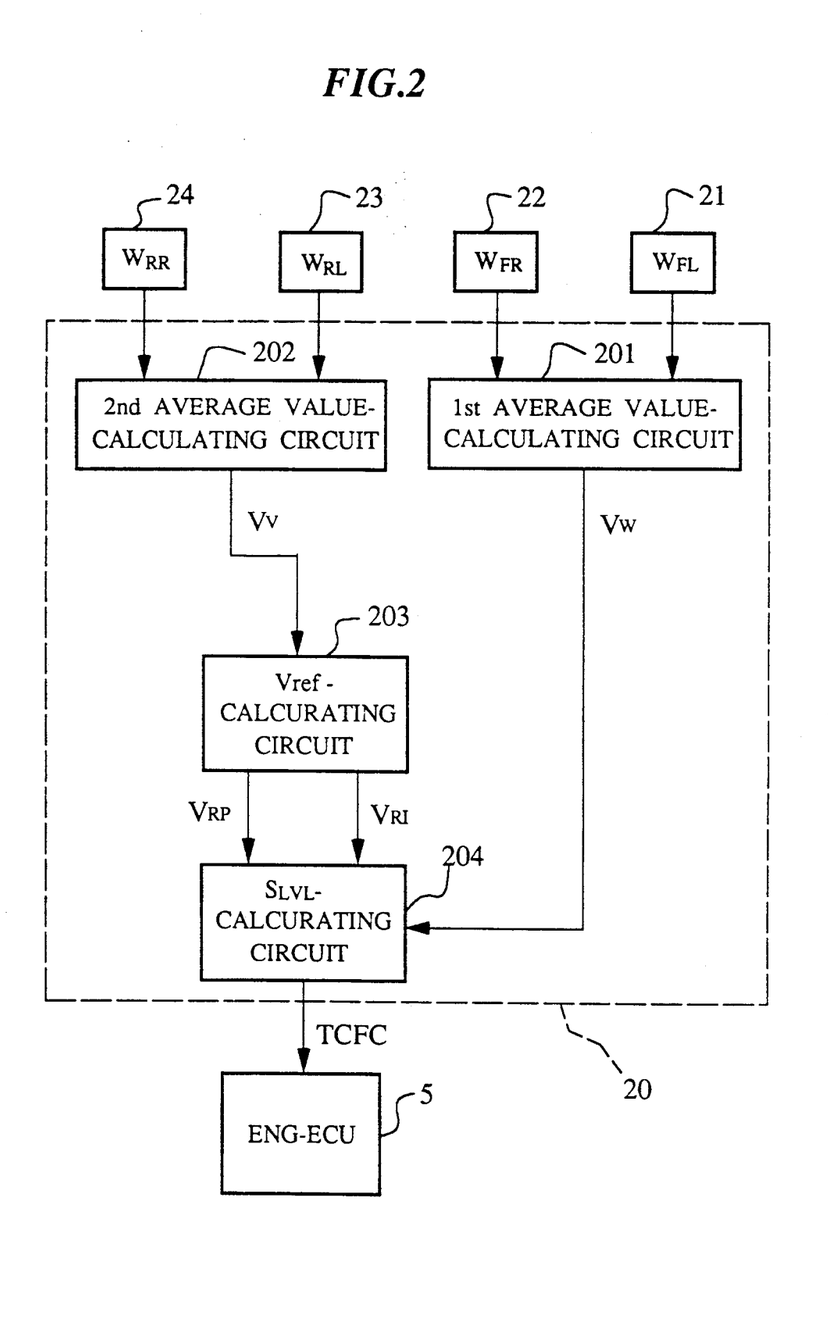
FIG. 2 is a block diagram showing the construction of an electronic control unit for detecting slip of driving wheels.

FIG. 2 shows the internal construction of the TCS-ECU 20. Signals from the right and left driving wheel speed sensors 21, 22 are supplied to a first average value-calculating circuit 201, which calculates an average value $V_W(=(W_{FL}=W_{FR})/2)$ of the rotational speeds of the right and left driving wheels and supplies the calculated value to an $S_{LVL}$-calculating circuit 204, referred to hereinafter.

On the other hand, signals from the right and left trailing wheel speed sensors 23, 24 are supplied to a second average value-calculating circuit 202, which calculates an average value $V_V[=(W_{RL}=W_{RR})/2]$ of the rotational speeds of the right and left trailing wheels as a vehicle speed, and supplies the calculated value to a reference driving wheel speed ($V_{ref}$)-calculating circuit 203. The reference driving wheel speed ($V_{ref}$)-calculating circuit 203 calculates a desired value $V_{RP}$ of the driving wheel speed, and a first predetermined driving wheel speed $V_{R1}$, as reference driving wheel speeds (Vref) corresponding to the vehicle speed $V_V$, and supplies the calculated values to the $S_{LVL}$-calculating circuit 204.

The two reference driving wheel speeds $V_{R1}$ and $V_{RP}$ are set such that the slip rate λ of driving wheels $[λ=(V_W+V_V)/V_W]$ should assume e.g. 5% and 8%, respectively, at $V_{R1}$ and $V_{RP}$. When the detected driving wheel speed $V_W$ exceeds the first predetermined driving wheel speed $V_{R1}$ (i e. when the slip rate λ exceeds 5%), the traction control is started.

The $S_{LVL}$-calculating circuit 204 calculates a slip level $S_{LVL}$ as a parameter oorresponding to a degree of slip of driving wheels, based on the detected driving wheel speed $V_W$, and the reference driving wheel speeds $V_{R1}$ and $V_{RP}$, and supplies the results of calculation as an $S_{LVL}$ signal to the ENG-ECU 5 by way of a signal line TCFC. The slip level $S_{LVL}$ assumes a higher value as the slip rate λ of driving wheels is larger.

Figure 3:
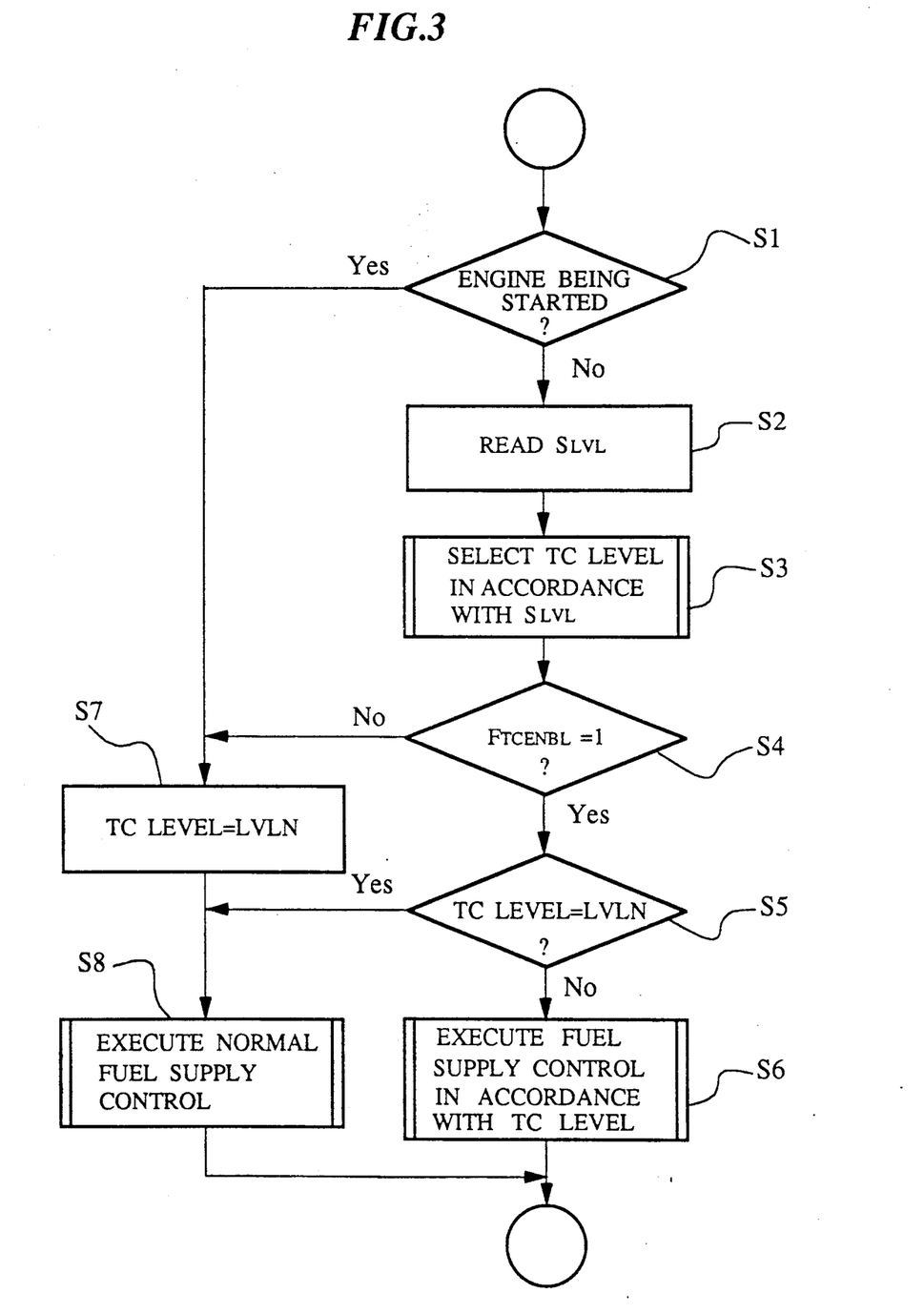
FIG. 3 is a flowchart of a program for carrying out traction control.

FIG. 3 shows a program of traction control, i.e. engine output control by carrying out leaning or fuel cut of the mixture to be supplied to the engine 1 in response to the slip level $S_{LVL}$. This program is executed upon generation of each TDC signal pulse and in synchronism therewith.

First, at a step S1, it is determined whether or not the engine 1 is being started or cranked. If the answer to this question is affirmative (Yes), i.e. if the engine is being started, the traction control level (hereinafter referred to as "the TC level") is set to a level LVL N at a step S7, whereby normal fuel supply control is carried out at a step S8. If the answer to the question of the step S1 is negative (No), i.e. if the engine 1 is not being cranked but operation thereof has become self-sustaining, the value of the slip level $S_{LVL}$ is read from the $S_{LVL}$ signal inputted by way of the TCFC signal line (step S2).

Figure 4:
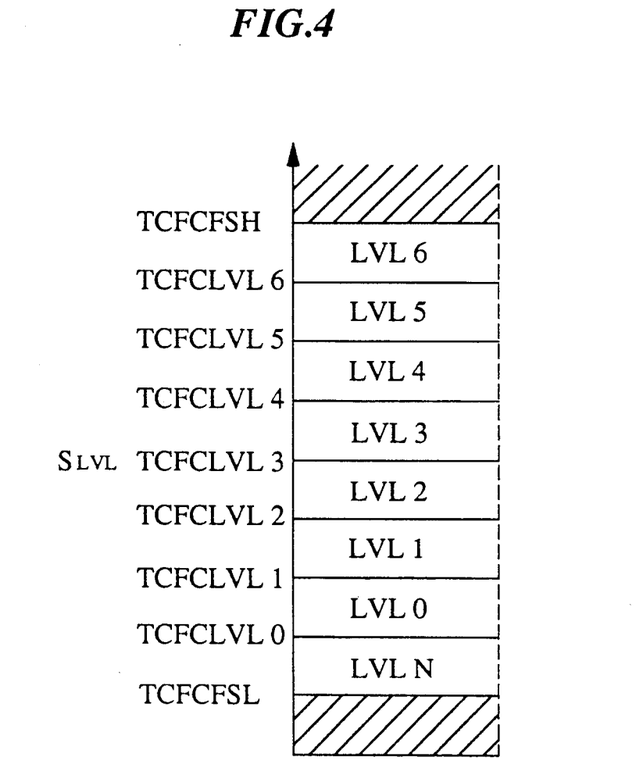
FIG. 4 is a view showing traction control (TC) levels corresponding to slip levels $S_{LVL}$, based upon which fuel supply is to be controlled.

Then, at a step S3, in accordance with the slip level $S_{LVL}$, the TC level is selected, e.g. as shown in FIG. 4. Specifically, the TC level is determined in the following manner:

(i) If TCFCFSL ≦$S_{LVL}$ <TCFCLVL 0, the TC level =LVL N.

(ii) If TCFCLVL i ≦$S_{LVL}$ <TCFCLVL (i +1), the TC level =LVL i (provided that i =0 to 5).

(iii) If TCFCLVL 6 ≦$S_{LVL}$ ≦TCFCFSH, the TC level =LVL 6.

where TCFCFSL and TCFCFSH are respective predetermined lower and upper limit values provided for the purpose of fail safe operation. TCFCLVL 0 to TCFCLVL 6 are predetermined values provided within the range defined by the lower and upper limit values.

Figure 5:
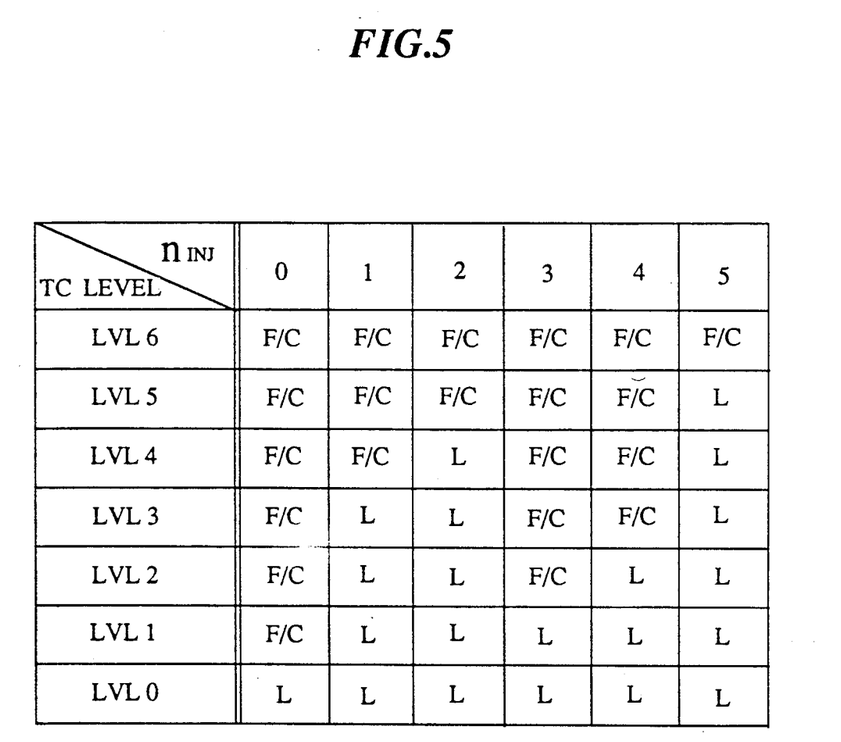
FIG. 5 is a view showing a table for determining a cylinder or cylinders with respect to which leaning of the air-fuel mixture or fuel cut is to be effected in accordance with the determined traction control level.

FIG. 5 shows an example of a table for determining a manner of cylinder-by-cylinder traction control carried out in response to the TC level and based on a count value $η_{INJ}$ of a control counter $η_{INJ}$, referred to hereinafter. In the figure, symbol L represents leaning of the air-fuel mixture supplied to the engine, while symbol F/C represents fuel cut. $η_{INJ}$, i.e. 0 - 5, in the columns represent count values of the control counter $η_{INJ}$ to be employed as a control variable. The count values $η_{INJ}$ designate cylinders in such a manner that $η_{INJ}=0$ corresponds to a cylinder into which fuel should be first injected after the start of the traction control, and $η_{INJ}=1$ to 5 correspond to respective cylinders into which fuel should be sequentially injected thereafter in the order shown by the number. For example, in the case of the TC level =LVL 0, the air-fuel ratio of the mixture supplied to all the cylinders is leaned. In the case of the TC level =LVL 1 to LVL 6, at least one cylinder is subjected to fuel out. More specifically, in the case of the TC level =LVL 6, all the cylinders are subjected to fuel cut, and in the case of the TC level =LVL 1 to 5, at least one cylinder is subjected to fuel cut, while the remaining cylinder(s) other than the at least one cylinder is/are subjected to leaning of the air-fuel mixture.

For example, in the case of the TC level =LVL 1 in which only one cylinder should be subjected to fuel cut, fuel injection is carried out in the following manner: If the count value $η_{INJ}$ has been set to 0, the cylinder corresponding to $η_{INJ}=0$ is first subjected to fuel cut, and the count value $η_{INJ}$ is progressively increased by an increment of 1 in the following loops corresponding to respective TDC signal pulses generated thereafter to values 1, 2, 3, 4, 5, and accordingly cylinders corresponding to the respective increased values of the count value $η_{INJ}$ are subjected to leaning of the air-fuel mixture in the following loops. The maximum value of the count value $η_{INJ}$ that can be assumed by the control counter $η_{INJ}$ corresponds to the number of all the cylinders of the engine 1.

Further, the control counter $η_{INJ}$ is controlled such that the count value $η_{INJ}$ assumes a predetermined negative value under a predetermined condition. So long as the count value $η_{INJ}$ assumes the negative value, the above table is not applied to traction control.

Setting of the count value $η_{INJ}$ of the control counter $η_{INJ}$ as a control variable is carried out in a subroutine described hereinafter with reference to FIG. 6.

In addition, LVL N in FIG. 4 represents the state in which traction control is not carried out. That is, at LVL N normal fuel supply control is carried out.

Referring again to FIG. 3, at a step S4 following the step S3 described above, it is determined whether or not a flag $F_{TCENBL}$ is equal to 1. The flag $F_{TCENBL}$ is set to 1 by another subroutine, not shown, when conditions (hereinafter referred to as "the TC conditions") for carrying out traction control are satisfied, i.e. when the engine is in a predetermined operating condition determined the throttle valve opening $\theta_{TH}$, the engine rotational speed Ne, the engine coolant temperature $T_W$, the intake air temperature $T_A$, etc.

If the answer to the question of the step S4 is negative (No), i.e. if $F_{TCENBL} = 0$, which means that the TC conditions are not satisfied, the TC level is set to LVL N at the step S7, and normal fuel supply control is carried out at the step S8.

On the other hand, if the answer to the question of the step S4 is affirmative (Yes), i.e. if $F_{TCENBL} = 1$, which means that the TC conditions are satisfied, it is determined at a step S5 whether or not the TC level has been set to LVL N. If the answer to this question is affirmative (Yes), i.e. if the TC level has been set to LVL N, the program proceeds to the step S8, whereas if the answer is negative (No), i.e. if the TC level has been set to any one of LVL 0 to LVL 6, leaning of rhe air-fuel mixture or fuel out is carried out in accordance with the TC level at a step S6. Leaning of the air-fuel mixture is effected by applying a value of the basic fuel amount Ti read from the traction control Ti map to the above-mentioned equation (1).

Further, in effecting leaning of the air-fuel mixture at the step S6, the ignition timing may be advanced or retarded in accordance with the engine rotational speed Ne, at tbe same time of leaning of the air-fuel mixture.

Figure 6:
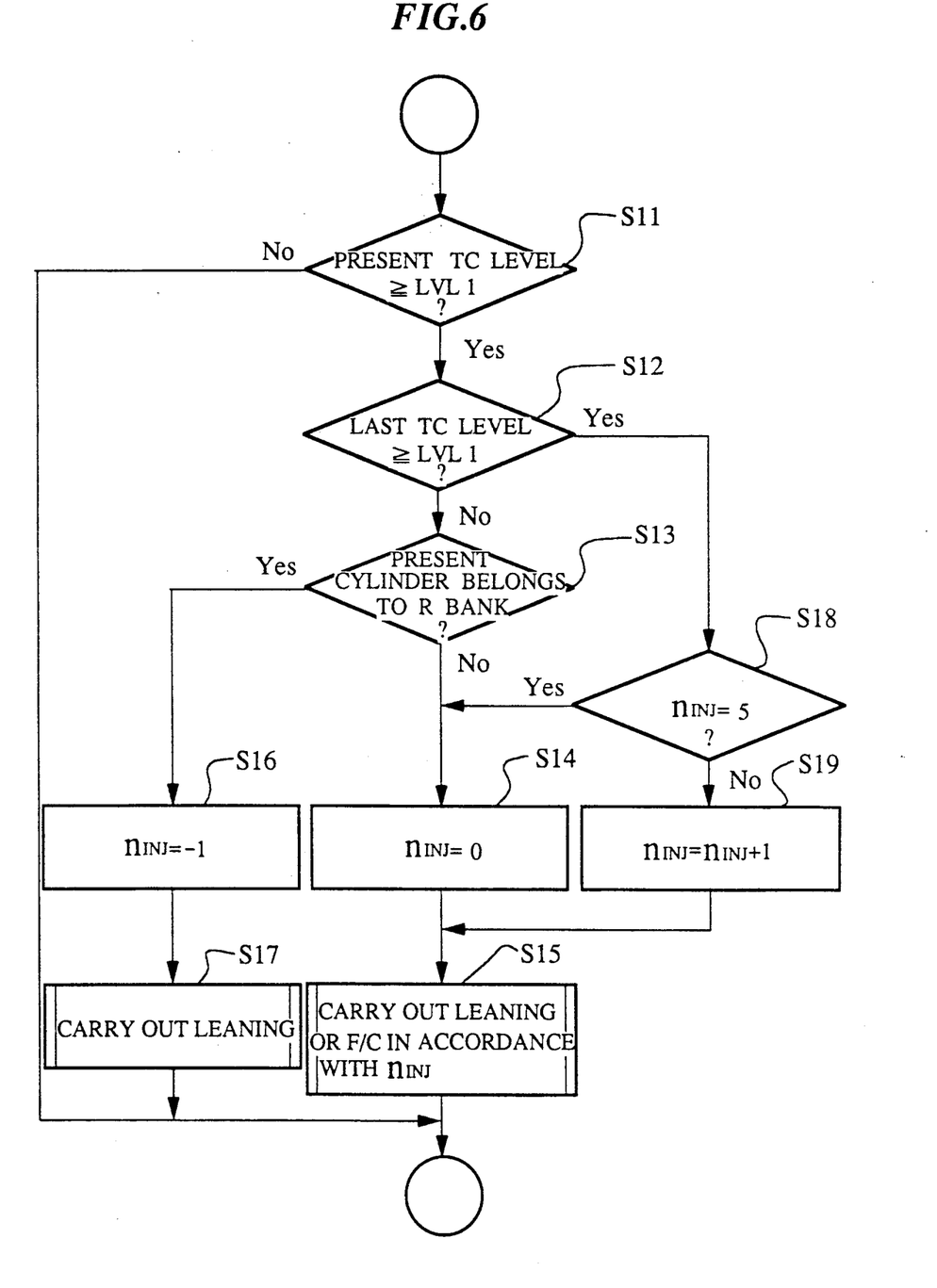
FIG. 6 is a flowchart of a program for determining a reference cylinder with reference to which is to be carried out cylinder-by-cylinder control, including fuel cut inhibition control.

FIG. 6 shows an example of a subroutine for setting a reference cylinder (a cylinder corresponding to the count value $\eta_{INJ} = 0$ for cylinder-by-cylinder control.

According to this program, the manner of traction control carried out cylinder by cyliner is determined by the count value $\eta_{INJ}$ and the TC level.

First, at a step S11, the TC level which has been selected in accordance with the slip level $S_{LVL}$ at the steps S2 and S3 in FIG. 3 is monitored, and it is determined whether or not the present TC level is equal to or higher than LVL 1. Since, as stated previously, at a TC level equal to or higher than LVL 1, at least one cylinder is to be subjected to fuel cut, it will be understood that this step is provided for determining whether or not fuel cut of any cylinder is demanded by traction control.

If the answer to the question of the step S11 is negative (No), i.e. if the TC level is lower than LVL 1, the present program is immediately terminated. More specifically, since the TC level is equal to LVL N which does not demand leaning of the mixture nor fuel cut, or to LVL 0 which demands subjecting all the cylinders to leaning of the mixture but does not demand fuel cut, the present program is immediately terminated.

On the other hand, if the answer to the question of the step S11 is affirmative (Yes), the present program proceeds to steps S12 et seq. At the step S12, it is determined whether or not the TC level in the last loop was equal to or higher than LVL 1. If the answer to this question is negative (No), i.e. if the TC level $\leq$ LVL 1 in the present loop (determined at the step S11) and the TC level <LVL 1 in the last loop, it is decided that the TC level has become equal to or higher than LVL 1 for the first time in the present loop, and the program proceeds to a step S13. As can be understood from the above, the step S13 is executed only when it is determined for the first time that fuel cut of at least one cylinder is demanded.

At the step S13, it is determined whether or not the cylinder to be controlled in the present loop belongs to the rear bank of the V-type engine. If the answer to this question is affirmative (Yes), i.e. if the cylinder to be controlled belongs to the rear bank, steps S16 and S17, referred to hereinafter, are executed in this embodiment of the invention, followed by terminating the present program. On the other hand, if the cylinder to be controlled in the present loop belongs to the front bank, the control variable $\eta_{INJ}$ to be used in the above-mentioned table is initialized at a step S14 and the manner of traction control based on the control variable $\eta_{INJ}$ is decided at a step S15, followed by terminating the present program.

According to the above-mentioned table of FIG. 5 for determining the manner of traction control, if the TC level is equal to any of LVL 1 to LVL 6, and at the same time the count value $\eta_{INJ}$ is equal to 0, it is so set that fuel cut should be carried out. Therefore, the cylinder to be controlled in the first place when traction control demands fuel cut, i.e. one belonging to the front bank in the present case, is determined to be subjected to fuel cut. Based on this determination, according to the fuel supply control at the step S6 in FIG. 3, $T_{OUT}$ is set to 0, i.e. the cylinder belonging to the front bank is subjected to fuel cut.

In this way, if the cylinder to be subjected to fuel cut when traction control responsive to the slip state of driving wheels demands fuel cut for the first time belongs to the front bank, the count value $\eta_{INJ}$ is unconditionally set to Q to thereby immediately carry out fuel cut.

In the following loops, so long as the TC level is equal to or higher than LVL 1, whenever the program proceeds from the step S11 to the step S12, the answer to the question of the step S12 becomes affirmative (Yes), so that the program proceeds to steps S18 et seq.

At the step S18, it is determined whether or not the count value $\eta_{INJ}$ is equal to 5. If the answer to this question is negative (No), i.e. if the count value $\eta_{INJ}$ has not reached 5, it is increased by 1 at a step S19, and then the program proceeds to the step S15, followed by terminating the present program. For example, if the TC level is equal to LVL 1, the count value $\eta_{INJ}$ becomes equal to 1 (i.e. $0 + 1 = 1$) in the loop immediately following the loop in which the count value $\eta_{INJ}$ was set to 0 at the step S14, so that a cylinder which belongs to the rear bank and is to be controlled immediately following the cylinder of the front bank, which was subjected to fuel cut in the immediatelly preceding loop, is subjected to leaning of the air-fuel mixture.

When cylinder-by-cylinder control has thus been carried out based on the progressively-increased count values $\eta_{INJ}$ 0 to 5 in accordance with the control pattern of LVL 1 shown in FIG. 5 to complete one round of control of all the cylinders in subsequent loops. and the program proceeds from the step S12 to the step S18 in the immediately following loop the answer to the question of the step S18 becomes affirmative (Yes), i e. the condition of $\eta_{INJ} = 5$ is satisfied. Therefore, in the present case, the program proceeds from the step S18 to the step S14, where the count value $\eta_{INJ}$ is reset to 0. Thereafter, similarly to the above, there is carried out the second round of control of the cylinders in which at least the cylinder belonging to the front bank and to be first controlled is subjected to fuel cut.

On the other hand, if the answer to the question of the step S13 is affimative (Yes), i.e. if it is determined that the cylinder to be first controlled in the present loop belongs to the rear bank, the count value $\eta_{INJ}$ is set to a negative value of $-1$ at a step S16, and then the cylinder belonging to the rear bank is subjected to leaning of the mixture at a step S17, followed by terminating the present program. Thus, in this case, fuel cut is not carried out but the amount of fuel supply is decreased.

The reason for setting the count value $\eta_{INJ}$ to $-1$ at the step S16 is that since the cylinder to be controlled in the immediately following loop belongs to the front bank, fuel cut can be carried out with respect to the cylinder belonging to the front bank, more specifically, the table of FIG. 5 is applied from the immediately following loop. Further, leaning of the mixrure or deorease of the fuel supply is employed as a manner of inhibiting fuel cut, because it meets the requirements that traction control for suppressing slips of driving wheels should be started as soon as possible, while fuel cut should not be carried out in view of the uneven temperature distribution of the engine, i.e. the very hot rear bank.

Following the execution of the steps S16 and S17 in the present loop, the program proceeds from the step S12 to the step S18 in the immediately following loop. In this case, since the count value $\eta_{INJ}$ has been set to $-1$, the answer to the question of the step S18 becomes negative (No), and tbe count value $\eta_{INJ}$ is increased by at the step S19, so that the count value $\eta_{INJ}$ becomes equal to 0 for the first time. Then, the step S15 is carried out, followed by terminating the present program.

At the step S15, since the count value $\eta_{INJ}$ has become equal to 0, the cylinder to be controlled and belonging to the front bank is subjected to fuel cut in accordance with the table of FIG. 5.

Thereafter, similarly to the above described case, cylinder-by-cylinder control is carried out in accordance with the FIG. 5 table. For example, in the case of the TC level being equal to LVL 1, whenever one round of control of all the cylinders has been completed, a cylinder to be next controlled and belonging to the front bank when the count value $\eta_{INJ}$ is equal to 0 is subjected to fuel cut.

As described above, according to the invention, if a cylinder to be controlled belongs to the rear bank when traction control has started to demand fuel cut, the cylinder is subjected to leaning of the mixiure to thereby decrease the output torque of the engine, and a cylinder to be controlled in the immediately following loop, which belongs to the front bank, is subjected to fuel cut in accordance with demand by traction control. This shifts the sequence of cylinders by one cylinder with reference to the control pattern of FIG. 5, to thereby adjust tbe temperature distribution of the engine per se or the exhaust system thereof. In comparison with the conventional system in which fuel cut is carried out indiscriminately when demanded, irrespective of whether the cylinder to be controlled belongs to the rear bank or the front bank, traction control (driving wheel slip control) can be more suitably carried out for a V-type engine disposed transversely of the engine room, to thereby more effectively protect the engine and the exhaust sYstem thereof from thermal damage.

Although the engine is a V-type in the above described embodiment, this is not limitative, but the present invention may be applied to a horizontal opposed type, for example.

What is claimed is:

1. In a system for controlling a slip of at least one driving wheel of an automotive vehicle having an engine room in which is installed an internal combustion engine having a plurality of cylinders arranged, respectively, in a front bank located in a front portion of said engine room and a rear bank located in a rear portion of same, said system including driving wheel slip-detecting means for detecting a slip of said at least one driving wheel, and fuel supply cutoff means for cutting off the fuel supply to said engine, cylinder by cylinder, in response to an output from said driving wheel slip-detecting means;

the improvement comprising:

cylinder-discriminating means for determining whether or not a cylinder to be controlled in respect of fuel supply when said fuel supply cutoff means has determined that fuel cut is required for the first time after a predetermined oondition for carrying out control of said slip of said at least one driving wheel was satisfied, belongs to said rear bank; and fuel cut-inhibiting means for inhibiting said fuel supply cutoff means from cutting off the fuel supply to said cylinder, when said cylinder-discriminating has determined that said cylinder belongs to said rear bank.

2. A system according to claim 1, wherein said fuel cut-inhibiting means carries out leaning of an air-fuel mixture to be supplied to said cylinder to be controlled in respect of fuel supply.

3. A system according to claim 1, wherein said cylinders are sequentially controlled in respect of fuel supply in predetermined sequence in a manner such that cylinders on said front bank and cylinders on said rear bank are alternately controlled, and wherein a cylinder to be controlled in respect of fuel supply immediately following said first-mentioned cylinder is subjected to fuel cut by said fuel supply cutoff means.

4. A system according to any of claims 1-3,, wherein the ratio of the number of cylinders to be subjected to fuel cut to the number of cylinders to be subjected to leaning of an air-fuel mixture is increased as a slip level of said at least one driving wheel detected by said driving wheel slip-detecting means is higher.

* * * * *